Figure 4:
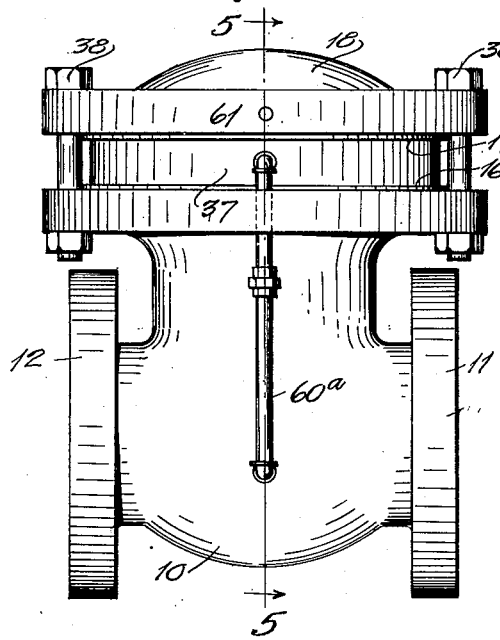

Aug. 29, 1939.  J. R. POLSTON  2,171,190
AUTOMATIC CHECK AND SHUT-OFF VALVE
Filed June 30, 1937  2 Sheets-Sheet 1
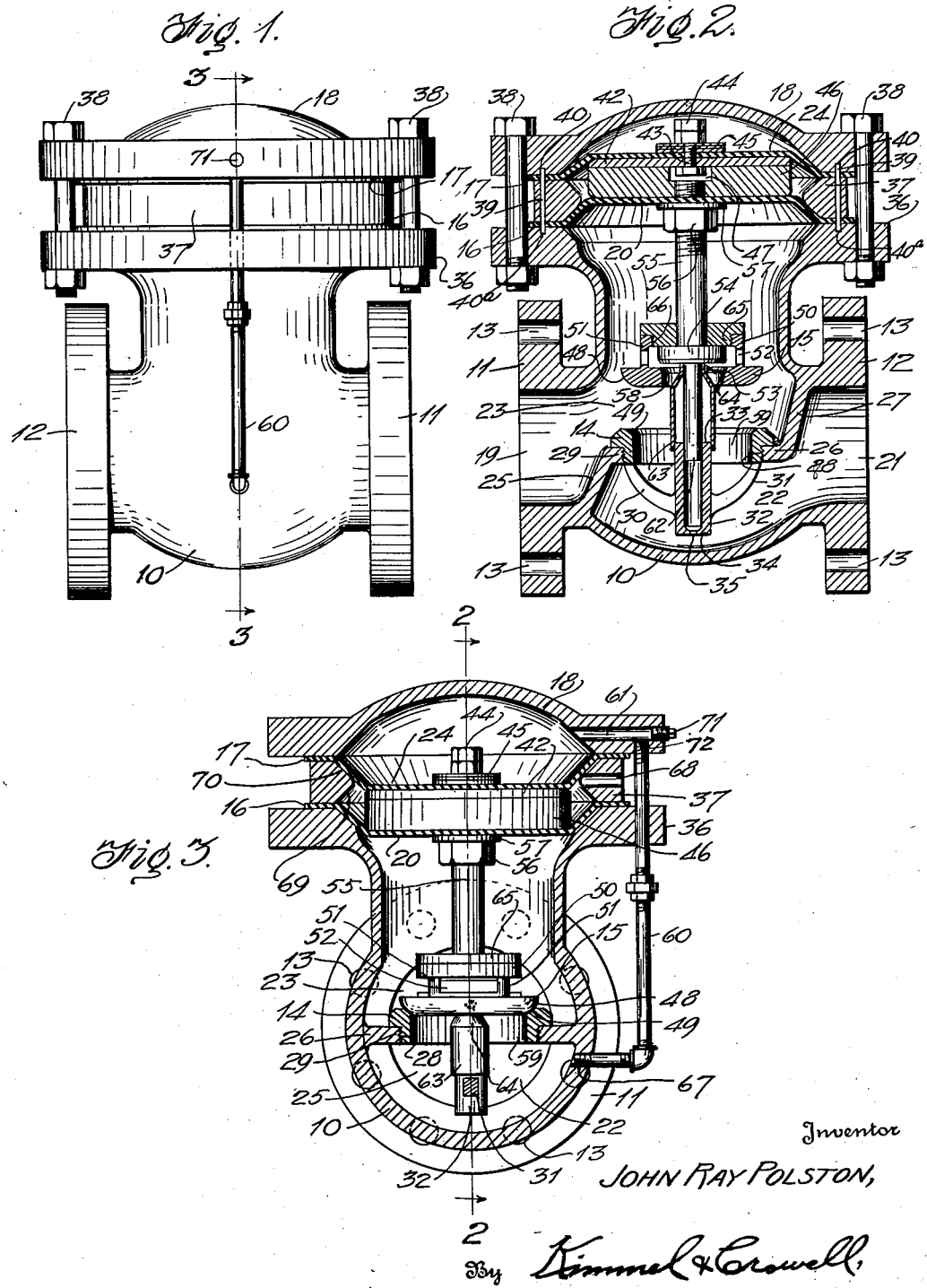
Inventor
JOHN RAY POLSTON,
By Kimmel & Crowell,
Attorneys.

Aug. 29, 1939.  J. R. POLSTON  2,171,190

AUTOMATIC CHECK AND SHUT-OFF VALVE

Filed June 30, 1937   2 Sheets-Sheet 2

Inventor
JOHN RAY POLSTON,

By Kimmel & Crowell
Attorneys

Patented Aug. 29, 1939

2,171,190

UNITED STATES PATENT OFFICE 2,171,190

AUTOMATIC CHECK AND SHUT-OFF VALVE

John Ray Polston, Tulsa, Okla.

Application June 30, 1937, Serial No. 151,267

6 Claims. (Cl. 137—153)

This invention relates to valves and more particularly to valves operated by fluid pressure.

In the oil industry, producing wells generally have a storage tank or reservoir into which the oil is allowed to accumulate if the pressure of the well is sufficiently high, and into which the oil is pumped if the pressure of the well falls below the necessary values. When the oil has reached an appropriate depth in the storage reservoirs, the reservoir is connected to a receiving tank or reservoir. The oil is preferably allowed to flow by gravity from the storage reservoir into the receiving reservoir. Where one or more of the storage reservoirs or tanks is lower than the receiving tank, it is necessary to use a pump to cause the oil to flow from the storage tank into the receiving tank. Where two or more of these storage tanks feed into a common gathering line, a so called tank battery exists. After the pump drawing liquid from low level tanks builds up pressure in the gathering lines from higher level tanks, it is possible that the oil may be pumped from one producer tank into another producer tank instead of into the gathering tank of the pipe line company. Where the oil flows by gravity from the storage reservoir into the receiving tanks or reservoir, and no means are provided for preventing air from displacing the oil in the pipe-line, after all of the oil has flowed out of storage reservoir, then the pipe-line becomes airlocked; which means that air is trapped at high points in the pipe-line and thus retards the flow of oil at the next period that oil is turned into the pipeline.

It is readily apparent that some means must be provided which will at all times allow the oil to flow from a producing tank and which will prevent a flow of oil from the gathering lines into a producing tank. Furthermore, it is necessary to prevent a flow of oil from a producing tank having low relative elevation into other producing tanks of lower relative elevation. It is also very important that the pipe-lines in a gathering system do not become airlocked, especially those that depend upon gravity flow.

An object of this invention is to provide means for avoiding the foregoing difficulties.

Another object is to provide an improved automatic valve for eliminating the heretofore described difficulties. Another object is to provide an improved valve construction. Further objects include the provision of a valve which will always operate to shut off the producer tank from the gathering line whenever the pressure in the gathering line exceeds the pressure in the producer tank, and also which will close the line whenever the pressure in the producing tank decreases below some determinable minimum.

Further objects and advantages of this invention will be readily understood from the following description taken in connection with the accompanying drawings.

Figure 5:
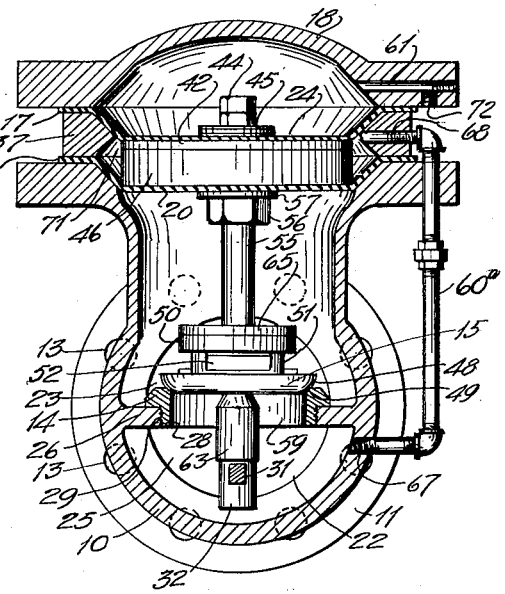
Figure 6:
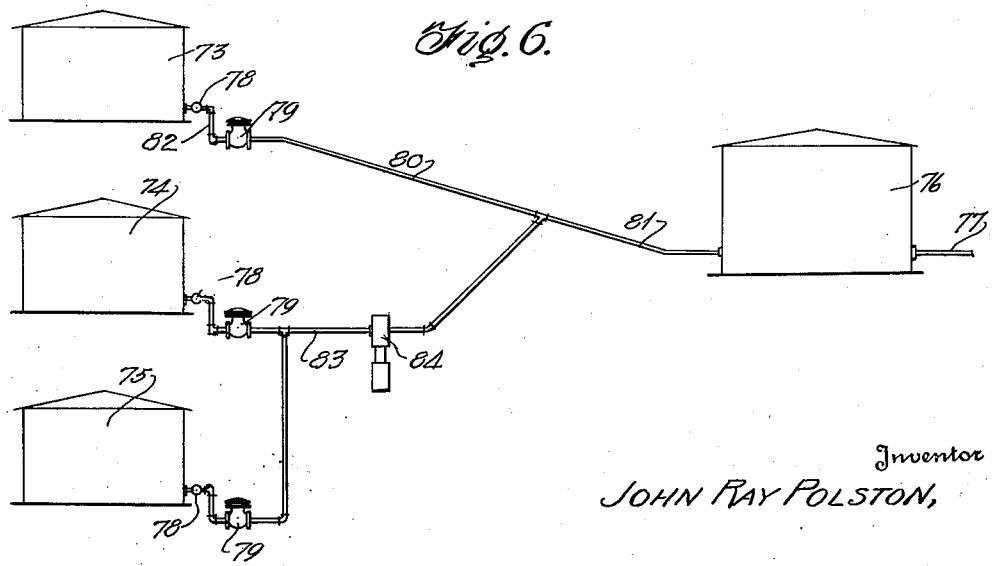

In the drawings: Figure 1 is a side elevation of a valve including features of this invention; Figure 2 is a vertical cross section showing the valve in open position and corresponding to a section on line 2—2 of Figure 3; Figure 3 is a transverse cross section on line 3—3 of Figure 1; Figure 4 is an elevation similar to Figure 1 showing a slightly modified operating connection; Figure 5 is a transverse cross section on line 5—5 of Figure 4 with the valve in seated position; and Figure 6 illustrates an application of the improved valves in an oil gathering system.

Considering the drawings in greater detail, the improved valve construction is shown in Figures 1, 2 and 3. The valve comprises a main housing 10 having inlet and outlet flanges 11 and 12 respectively for securement at points 13 to the pipe line. Interiorly of the housing is a main valve seat 14 and a main valve 15 relatively movable with respect to the seat, and having flanged cup-shaped flexible diaphragms 16 and 17 positioned in the head 18 of the valve and arranged to move the valve with respect to its seat. Liquid flowing into the inlet opening 19 exerts an upward pressure against the face 20 of diaphragm 16 and raises the valve 15, allowing liquid to flow from the outlet opening 21 into the appropriate gathering or gravity line. If the pressure in the outlet chamber 22 should exceed that in the inlet chamber 23 pressure acting on the lower face 20 of the diaphragm 16 will be ineffective to open the valve because of the application of pressure from the outlet chamber 22 upon the upper face of diaphragm 17. Under such circumstances, the valve will remain seated. If the pressure in chamber 22 is less than the pressure in chamber 23, the valve may then open provided the pressure in chamber 23 is greater than the minimum pressure for which the valve is allowed to operate.

Considering the valve construction in greater detail, the main housing 10 is divided into outlet and inlet chambers 22 and 23 respectively by partition walls 25, 26 and 27 and the central portion in which is provided the valve seat 14. For economy of maintenance, valve seat 14 is removable or replaceable so that instead of having to remove the entire valve structure, it is merely necessary to replace the valve seat when wear occurs. An outer peripheral portion 28 of the valve seat is provided with screw threads for engagement with the threaded portion 29 of the partition. In this way the valve seat can be locked into a definite location. The valve seat also carries a pair of depending arms 30 and 31 which carry a central bearing structure 32. This bearing structure is substantially cylindrical in form having an open upper end 33 and having a closed or bottom end 34 provided with a small opening 35.

The valve operating mechanism is housed in the upper part of the valve structure. The body portion and more especially the inlet chamber 23 opens upwardly and the housing terminates with the flange 36. The flanges of the diaphragms 16, 17 are outwardly directed at the upper ends of the cup-shaped bodies of such diaphragms. The flange of the diaphragm 16 is positioned on the upper face of flange 36 and on said plan is positioned the diaphragm spacer ring 37 maintaining the lower diaphragm 16 in spaced relation with respect to the upper diaphragm 17. The flange of the diaphragm 17 is seated on the ring 37. The valve head or cover 18 is positioned upon the flange of the upper diaphragm and secured to the flange 36 by means of a series of bolts 38. For the purpose of aligning the parts in proper position, two dowel pins or rods 39 are provided. These pins pass through aligned openings in the two diaphragms and spacer ring and seat in openings 40 and 40a in the respective flanges of the valve housing and valve cover. In this manner, parts will always be aligned in proper position. The diaphragms 16, 17, cover 18 and spacer ring 37 provide a sectional structure which closes the upper end of chamber 23 and with such structure including upper and lower superimposed compartments, each having its bottom formed by a diaphragm. With reference to the form shown in Figure 3, the lower compartment communicates with the atmosphere and the upper compartment communicates with the chamber 22. The form shown in Figure 5 discloses the upper compartment communicating with the atmosphere and the lower compartment communicating with the chamber 22.

The upper diaphragm is entirely independent of the lower diaphragm in so far as mechanism connections are concerned. It will be understood, however, as hereinafter pointed out, that this diaphragm can cooperate with the lower diaphragm under appropriate circumstances. The upper diaphragm is weighted by a weight 42 which is secured centrally by the bolts and nuts 43 and 44, the latter being spaced from the flexible phragms are arranged in the lower compartner, the hole through the diaphragm will be effectively sealed and the diaphragm will not be damaged by tightening of the bolts.

The lower diaphragm is also weighted having mounted thereupon the heavier weight 46. The upper surface of the weight 46 is counterbored as at 47 so as to receive the nut 43 without any mechanical interference between the parts. This diaphragm is connected to the main valve as hereinafter described. The weights for the diapphragms are arranged in the lower compartment provided in the sectional structure which closes chamber 23. The weight 42 for the diaphragm 17 is arranged against the lower face of the latter. The weight 46 for the diaphragm 16 is arranged on the upper face of the latter.

The main valve includes an annular lower part 48 which provides a seating surface 49 arranged to cooperate with the surface 49 of the removable valve seat 18 for the purpose of closing the latter. The annular lower part 48 of the main valve provides an outlet therefor. The main valve is constructed in the form of a cage and it not only includes the annular lower part 48, but a circular upper part 65 formed with an axial opening and having the marginal portion of its lower face rabbeted throughout and peripherally threaded as at 66, and an annulus 50 which is connected at its top with the threads 66 and having its bottom integral with the upper face of the part 48. The annulus 50 is of less diameter than the part 48 and is formed with a series of openings 51 which constitute intake ports and through which liquid may flow from the inlet side of the valve 15. The openings are spaced by the portions 51 of the annulus 50. Centrally of the upper face of the lower annular part 48 the latter is provided a valve seat 53 for the auxiliary valve 54. The auxiliary valve 54 is formed on the main valve stem 55 and is movable therewith. The valve stem 55 is secured in threaded engagement to the weight 46 and in turn locked to the diaphragm 16 by a nut 56 and an interposed washer 57. This washer similarly seals the opening through the diaphragm and prevents the nut from cutting the diaphragm. It will now be observed, that pressure operating on the lower face of the diaphragm 16 will move the diaphragm in an upward direction and will also raise the valve stem 55 and the auxiliary valve carried on it. The auxiliary valve 54 will rise off of its seat and will allow liquid from the inlet 19 to flow through the ports 52 in the main valve through the valve seat 53, the opening 58 of the main valve, and the opening 59 in the main valve seat and then into the outlet chamber 22. The liquid reaching the outlet 21 will then flow into the gravity line connected to a gathering tank or to the inlet of an appropriate pump, when gravity is insufficient to cause the necessary flow of oil. If the pressure in the outlet chamber 22 exceeds the pressure from the inlet side of the valve this pressure will be transmitted by means of the pipe 60 to the upper surface of diaphragm 17. Inasmuch as the surfaces of the two diaphragms are the same, the resulting excess pressure on the upper diaphragm in addition to the effect of the weights will cause the valve to close. If the inlet pressure falls below that necessary to oppose the action of the weights, the valve will also close. If the pressure on the outlet side of the valve rises to any appreciable amount, it will force the valve closed.

If the outlet side of the valve is subjected to a vacuum, the upper diaphragm 17 and weight 42 will be lifted from its resting position on weight 46. Air from the atmosphere will fill the space between weight 42 and weight 46 by means of port 68. Thus no vacuum from outlet side of valve will be transmitted to lower diaphragm 16, and therefore weight 46 will hold the valve in a closed position unless the liquid pressure on inlet side of valve is sufficient to lift weight 46. Therefore, the valve remaining in a closed position during periods of low liquid level on inlet side of valve and with vacuum on outlet side of valve prevents air or vapor from entering the pipe-line which would eventually cause a vapor locked condition in the pipe-line.

To prevent chattering of the valve when a slight difference in pressure occurs, the lower part 62 of the main valve stem 55 is of reduced diameter and is slightly smaller than the diameter of the bearing 33. This part of the valve stem acts as a piston riding up and down in the bearing cylinder and its action is retarded by means of the delayed fluid flow through the port 35, so that these parts cooperate to retard movements of the valve and to provide an action similar to that of a dash pot.

Oil frequently contains very fine sand which will readily destroy the walls of the dash pot. To avoid the direct action of the oil upon the valve stem and the bearing, a truncated sleeve or skirt 63 is attached to the valve stem by means of a screw 64. The oil flowing through the valve will not flow directly against the valve stem 62.

The auxiliary valve 54 has limited relative movement with respect to the main valve 15. This movement is limited in the lower direction by the valve seat 53 and in the upper direction by the circular upper part 65 of the valve 15. It will now be appreciated that the auxiliary valve may open a limited amount independently of the movement of the main valve. The dash pot and its retarding action controls both valves with respect to their seats so as to avoid chattering. In the arrangement in connection with Figures 1, 2 and 3, the outlet pressure of the valve is applied to the upper surface of the diaphragm 17 by the pipe connection 60 connecting at the lower end by a port 67 into the outlet chamber and by a passage 61 in the head of the valve. In this arrangement, the spacing ring 37 contains a passage 68 open to the atmosphere. The inner surfaces of the spacing ring are also bevelled at 69 and 70 to prevent undue wear on the diaphragms.

In Figures 4 and 5, the structure of the valve is similar to that in Figures 1 to 3 inclusive, but a slightly different operating means is provided. In this instance, the port 67 in the outlet chamber 22 of the valve is in communication with the space 71 between the two diaphragms by a connection 60a to the port 68. In this instance, the space above the diaphragm 17 is left in communication with the atmosphere by removing the plug 71 from the end of the passage 61, or by merely leaving the threaded port 72 open. If the outlet side of the valve is subjected to a vacuum, the two diaphragms tend to collapse. Atmospheric pressure on the upper surface of the upper diaphragm and the two weights cooperating together all tend to retain the valve closed. If a pressure above atmospheric occurs in the outlet side of the valve, the two diaphragms will be forced apart and the valve will likewise be retained on its seat. It will then be apparent that the valve can only open when the inlet pressure exceeds the outlet pressure, or where the outlet pressure is sufficiently low and the inlet pressure exceeds the load applied by the weights.

In Figure 6 the system is shown with producer tanks 73, 74 and 75, each one of which may represent a single tank or a battery of tanks. At the right hand side is a tank 76 corresponding to the gathering or collecting tank of a pipe line company. This tank feeds the pipe line 77 which may go to some distant point such as a refinery, distributing point, some storage system, or another pipe line. The tank or tanks 73 is of higher elevation than the tank 76 and by opening the stop valve 78 oil will flow by gravity through the automatic valve 79 (of this invention) and into the gravity line 80, finally feeding into the gathering line 81 and the gathering tank 76. Whenever the oil level in tank 73 falls to such a point that the pressure is less than that in the line 80, the valve 79 will close to prevent a flow of oil from the pipe line 80 back to the tank 73. Furthermore, when the level of liquid in the tank 73 has dropped to a point where air would enter pipe 82, the valve again closes to prevent any air from getting into the pipe system. The tanks 74 and 75 may represent a battery each having its stop valve 78 and its respective automatic valve 79 connected to the gathering pipe 83. In this instance, if the battery of tanks is lower in level than the gathering tank, then the oil would tend to flow from the gathering tank 76 into the battery of tanks. The valve 79 prevents this and a pump 84 is provided in the line to feed the oil to the gathering line.

Variations within the scope of this invention are covered by the appended claims.

I claim:

1. A combined check and shut-off valve including a housing having a dual valve structure for automatically controlling the flow through said housing, said dual valve structure comprising a main flow opening, a main valve seat in said opening, a floating main valve cooperating with said seat, an auxiliary flow opening in said main valve, an auxiliary valve seat in said auxiliary flow opening, an auxiliary valve cooperating with said auxiliary valve seat, means operatively connecting said auxiliary valve to said main valve, said means permitting limited independent movement of said auxiliary valve with respect to said main valve, a valve stem fixed to said auxiliary valve, a diaphragm unit operatively connected to said valve stem, one side of said unit being in communication with the inlet side of said main valve, whereby so long as there is an overbalancing pressure on said inlet side, the operation of said valves will be controlled by the inlet pressure, and the other side of said unit being in direct communication with the outlet side of said main valve, whereby a back pressure on said outlet side will maintain said valves in closed position.

2. A combined check and shut-off valve as claimed in claim 1 wherein said means operatively connecting said auxiliary valve to said main valve comprises a cage-like member carried by said main valve and slidably embracing said valve stem.

3. A combined check and shut-off valve as claimed in claim 1 wherein said diaphragm unit is weighted to normally close said valves at a pressure below a predetermined value on said inlet side.

4. A combined check and shut-off valve including a housing having a dual valve structure for automatically controlling the flow through said housing, said dual valve structure comprising a main flow opening, a main valve seat in said opening, a floating main valve cooperating with said seat, an auxiliary flow opening in said main valve, an auxiliary valve seat in said auxiliary flow opening, an auxiliary valve cooperating with said auxiliary valve seat, means operatively connecting said auxiliary valve to said main valve, said means permitting limited independent movement of said auxiliary valve with respect to said main valve, a valve stem fixed to said auxiliary valve, a diaphragm unit, a pair of spaced independent diaphragms in said unit, one of said diaphragms being connected to said valve stem and responsive to pressure conditions on the inlet side of said main valve, whereby so long as there is an overbalancing pressure on said inlet side, the operation of said valves will be controlled by the inlet pressure, and the other of said diaphragms being responsive to pressure conditions on the outlet side of said main valve, whereby a back pressure on said outlet side will maintain said valves in closed position, the area between said diaphragms being open to atmosphere.

5. A combined check and shut-off valve as claimed in claim 4 wherein at least one of said diaphragms is weighted to normally close said valves at a pressure below a predetermined value on said inlet side.

6. An automatic check and shut-off valve comprising in combination, a housing having a main valve seat, a weighted main valve relatively movable with respect to said seat, an auxiliary port in said main valve, a main valve stem having relative movement with respect to said main valve, an auxiliary valve bodily carried by said main valve stem and arranged within said main valve, an auxiliary valve seat in said auxiliary port, a diaphragm connected to said main valve stem and operated in response to pressures on the inlet side of said main valve, said auxiliary valve opening in response to the initial upward movement of said main valve stem and said main valve being opened by said auxiliary valve in response to the further upward movement of said main valve stem, and a diaphragm arranged above said first named diaphragm and operated in response to pressure on the outlet side of said main valve for shifting said valve stem in a direction to close both the auxiliary valve and the main valve.

JOHN RAY POLSTON.